United States Patent
Holl et al.

(10) Patent No.: US 7,341,623 B2
(45) Date of Patent: Mar. 11, 2008

(54) SUBSTANCE MIXTURE AND A METHOD FOR INTRODUCING AT LEAST ONE PARTICULATE ACTIVE INGREDIENT COMPONENT INTO A LIQUID AQUEOUS SYSTEM

(75) Inventors: Martin Holl, Abtsgmund (DE); Andreas Niess, Aalen (DE); Heinz Gotz, Rosenberg (DE); Klaus Neitzer, Dusseldorf (DE); Heinz-Peter Hoffmann, Monheim (DE); Bernhard Schottmep, Monheim (DE)

(73) Assignee: Henkel KGaA, Dusseldorf (DE)

( * ) Notice: Subject to any disclaimer, the term of this patent is extended or adjusted under 35 U.S.C. 154(b) by 134 days.

(21) Appl. No.: 10/492,738

(22) PCT Filed: Oct. 15, 2002

(86) PCT No.: PCT/EP02/11482

§ 371 (c)(1),
(2), (4) Date: Dec. 15, 2004

(87) PCT Pub. No.: WO03/033570

PCT Pub. Date: Apr. 24, 2003

(65) Prior Publication Data

US 2005/0100596 A1 May 12, 2005

(30) Foreign Application Priority Data

Oct. 15, 2001 (DE) ................. 101 50 348

(51) Int. Cl.
*C08L 97/02* (2006.01)
*C09D 197/02* (2006.01)
*C09J 197/02* (2006.01)

(52) U.S. Cl. ............... 106/164.01; 106/162.5; 106/162.51; 106/165.01; 524/34; 524/35

(58) Field of Classification Search ........... 106/162.5, 106/162.51, 164.01, 165.01; 524/34, 35
See application file for complete search history.

(56) References Cited

U.S. PATENT DOCUMENTS 5,258,429 A * 11/1993 Kniewske et al. ............ 524/31
6,482,876 B1 * 11/2002 Witt-Nuesslein et al. ..... 524/35
6,871,746 B2 * 3/2005 Rettenmaier ................ 210/503

FOREIGN PATENT DOCUMENTS

| CS | 216494 | 10/1982 |
|---|---|---|
| DE | 3103338 | 8/1982 |
| DE | 19710315 | 10/1998 |
| DE | 19831856 | 1/1999 |
| DE | 19953867 | 5/2001 |
| EP | 0311873 | 4/1989 |
| EP | 416405 | 3/1991 |
| EP | 819787 | 2/1998 |
| EP | 686666 | 12/1999 |
| JP | 60042260 | 3/1985 |
| JP | 07267708 | 10/1995 |
| JP | 2001019921 | 1/2001 |
| WO | PCT/DE98/00589 | 9/1998 |

OTHER PUBLICATIONS

Falbe and Regitz, Rompp Chemie Lexikon, George Thieme Verlag Stuttgart, New York (1995), no month provided, pp. 3208-3212.

* cited by examiner

Primary Examiner—David M Brunsman
(74) Attorney, Agent, or Firm—Fay Sharpe LLP

(57) ABSTRACT

A mixture of substances is designated for introduction into a liquid aqueous system and comprises at least one extremely finely divided active substance component that is designated for subsequent dissolution or dispersion in the liquid aqueous system. The mixture of substances comprises a proportion of cellulose-containing plant fibers and is present in finely particulate form. The cellulose-containing plant fibers improve both the transformation of the extremely finely divided active substance component into the finely particulate form and also its subsequent redissolution in the liquid aqueous system.

20 Claims, 1 Drawing Sheet

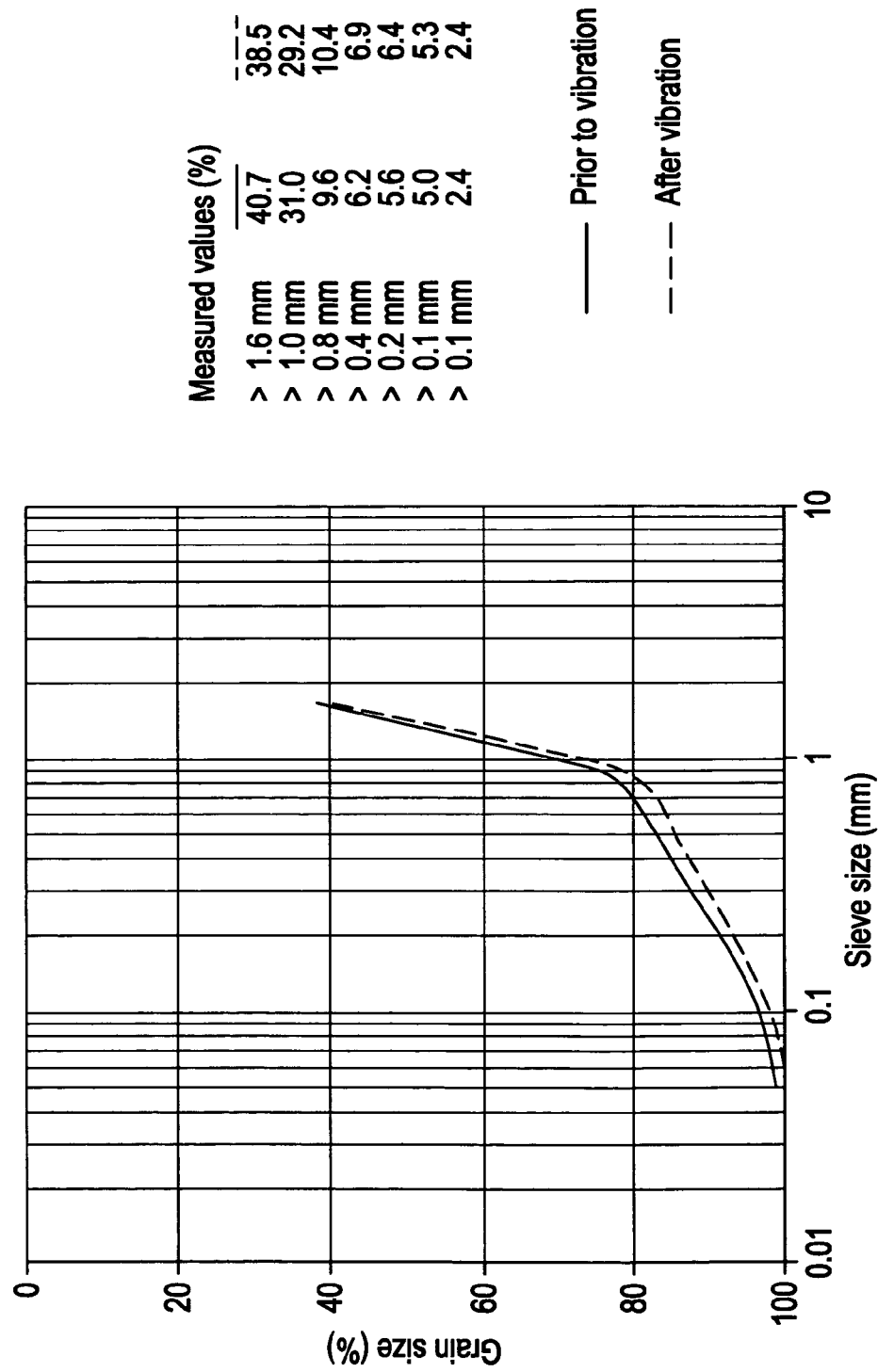

SUBSTANCE MIXTURE AND A METHOD FOR INTRODUCING AT LEAST ONE PARTICULATE ACTIVE INGREDIENT COMPONENT INTO A LIQUID AQUEOUS SYSTEM

This application is a 371 filing of PCT/EP02/11482, filed 15 Oct. 2002.

The invention pertains to a mixture of substances in accordance with the preamble of claim 1, and to a process in accordance with the preamble of claim 8.

Following manufacture, many chemical active substance components, which are processed further to give paste-like compositions or ready-to-use liquid systems with various viscosities, are present in the form of a pulverized material, a powder, a flour-like material, and even gritty configurations. These are to be termed "extremely finely divided." Because of their easier handling, and in order to prevent premature reactions in the liquid or moist phase, these substances are stored in the dry state and are brought onto the market in extremely finely divided form. For use, the substances are introduced into a liquid aqueous system, usually water, and, depending on their concentration, they then result in agents with a liquid or dough-like consistency that are usually spread out onto a surface and reveal their function in this form. Examples of these are starch-like adherent coating materials for carpets, thickeners, adhesives for wall covering materials, glues for wood, cement-like systems, such as leveling compositions and tile adhesives, floor covering adhesives, filling compositions, stone floor systems, etc.

The storage of extremely finely divided active substance components in dry form does have advantages relative to storing the ready-to-use products, but it also has problems because the handling of extremely finely divided, dry, active substance components and the exact, metered dispensing thereof are not simple, and there is also a tendency for such active substance components to become compacted in the event of storage over an extended period of time, and they are then no longer capable of flowing freely in a uniform manner. The dry compositions of the aforementioned starch-like adherent coating materials, adhesives, and filling compositions generally have several different components that have a different particle size, and a different density and surface structure, so that segregation can occur during storage when they are packaged in extremely finely divided form so that, during the removal of small portions from the drum, there is no assurance that constant proportions of each component are present in each portion. In addition, the uniform introduction of such extremely finely divided active substance components into a liquid is sometimes difficult.

The problem that forms the basis of the invention is to improve the handling, the exact metered dispensing, and the introduction [into a liquid] of an extremely finely divided active substance component of the type that is being addressed, and to avoid the caking together or compaction of the material in the event of storage over an extended period of time.

This problem is solved by the invention that is described in claim 1.

In contrast to "extremely finely divided," the expression "finely particulate" is used to designate larger aggregates with a diameter of 0.5 to several millimeters which form stable-shaped objects during handling and which are typically termed, e.g., pellets, or granulated materials.

Various processes are known in the prior art for the manufacture of such pellets or granulated materials, e.g., manufacturing pellets via extrusion and subsequently cutting the billets into pieces, or pelletizing with binders using pelletizing machines, or manufacturing a granulated material via compaction between rollers and subsequently breaking up the rolled two-dimensional structures that are formed.

The transformation of a mixture of substances into such a finely particulate form facilitates its handling and exact metered dispensing, and it avoids the onset of compaction of the material as a result of the caking together of the particles in the event of storage over an extended period of time. Segregation of the components of the material is avoided with such pellets or granulated materials. The material remains capable of being poured or even of flowing freely. Dust evolution during handling is avoided.

It is advantageous for the manufacture of these finely particulate shaped objects if the operation is carried out by subjecting the material to pressure that is as low as possible, especially during compacting. This ensures good care of the production plant and it is particularly advantageous for the subsequent introduction of the active substance components into a liquid. The more firmly the finely divided active substance components are pressed together in the manufacturing of the finely particulate shaped objects, the more poorly the shaped objects subsequently dissolve.

One function of the cellulose-containing plant fibers thus arises here. The cellulose-containing fibers have a certain ability to bind to one another via so-called hydrogen bonds that also reveal their action during the manufacture of paper in particular. This property of cellulose-containing plant fibers permits a lower compacting pressure to suffice during the manufacture of finely particulate shaped objects with adequate cohesion. The presence of the cellulose-containing plant fibers contributes to a portion of the particles' inner cohesion that is otherwise produced purely by means of compression. A certain proportion of the pressure can be "saved" as a result of this.

The possible reduction in specific compacting pressure during the manufacture of pelletized or compacted mixtures of substances is of importance not only for the subsequent introduction of the finely particulate shaped objects into liquid or aqueous systems, but also for such mixtures of substances that disintegrate via a shearing force alone. Disintegration is also thereby facilitated. Subsequent restitution into the extremely finely divided form becomes easier as the applied pre-compaction energy is reduced.

The second function of the proportion of cellulose-containing plant fibers comes into effect when the finely particulate shaped objects are introduced into a liquid. In aqueous systems, the cellulose-containing plant fibers bring about the rapid admission of water, namely along the cellulose-containing plant fibers, and hence into the particle in question that has been compacted to give a finely particulate shaped object. The additional cellulose-containing plant fibers, which are present in the interior of the finely particulate shaped object, form a sort of network and ensure the rapid and uniform distribution of the water, via capillary forces, throughout the entire shaped object, whereby this alone already triggers disintegration. The water, which is forging ahead at the boundaries of the extremely finely divided active substance components and the cellulose-containing plant fibers, additionally brings about slight swelling of the cellulose-containing plant fibers which, depending on the properties of the mixture of substances, consequently leads to the incipient swelling of the entire finely particulate shaped object, or to microfissure formation therein. In any case, the structural fabric of the finely particulate shaped objects is loosened and made ready for the release of the extremely finely divided active substance components.

The cellulose-containing plant fibers are capable of revealing these effects especially well within the framework of the invention because they have been chemically or physically pretreated in accordance with the TMP process, the CTMP process, or the EFC process (low-extraction cellulose), whereby this facilitates their cohesion in finely particulate form and also the advance of water into the interior of the finely particulate particles.

The TMP process represents the disintegration of wood clippings into fibers using steam under pressure, and the CTMP process represents the same thing with use being made of chemicals (see RÖMPP Chemie Lexikon ["Chemistry Lexicon"], 9th edition, Georg Thieme Verlag Stuttgart; New York (1995), keyword "Papier" [paper], page 3208, left-hand column, middle). The EFC process signifies the treatment of wood particles with an alkaline lye solution under atmospheric pressure (see DE 197 10 315 C2). The binding and disintegrating effect is especially pronounced with such fibers that have acquired a special surface structure via the treatment.

A mixture of substances of this general type is known from DE 198 31 856 A1. These are agglomerates, regardless of whether they are shaped components or aggregates, for the manufacture of an aqueous binder system. The agglomerates contain at least one hydrophilic agent that triggers disintegration, whereby this agent can have a fibrous structure, e.g., microcrystalline cellulose.

A composition comprising starch and cellulose-containing fibers is seen from DE-OS 199 53 867 A1 in which the starch and fibers are fixed to one another. The composition is granulated in the usage condition, and is suitable for the manufacture of molded entities such as packaging containers.

There is no mention in the aforementioned prior art of any sort of pretreatment of the cellulose-containing fibers.

An important feature in the case of the invention is also that the cellulose-containing plant fibers are rather inert chemically and they do not enter into any chemical interactions with the extremely finely divided active substance components or any other possible additives in the mixture of substances, whereby these interactions could impair, or change, the desired effects of the active substance components.

This applies, in particular, if the cellulose-containing plant fibers are essentially pure cellulose fibers. If, however, particular sensory neutrality is not an important issue, then the use of wood fibers is not ruled out, either.

The cellulose-containing plant fibers in the mixture of substances can be present in a proportion by weight of 2-18%, whereas in accordance with claim 3, the average lengths of the fibers should be in the 20-350-µm range in order to achieve optimum results.

The mixture of substances can contain a proportion of additives that improve the action of the active substance components and/or improve the characteristics of the active substance components in the mixture of substances.

In most cases, the liquid aqueous system will be water.

The embodiment wherein Mixtures of substances characterized by the fact that the extremely finely divided active substance component is
- a starch-like adherent coating material for carpets (cellulose ethers, starch ethers);
- a thickener (starch ethers, with and without synthetic resins);
- a wall coveting adhesive (starches that are soluble in cold water);
- dispersion powders;
- a cement-like system (leveling composition, tile adhesive);
- a floor covering adhesive; or
- a filling composition, especially one that is based on gypsum, or such a stone floor system describes a series of examples of the active substance components.

These mixtures of substances are binder agglomerates. They contain substances that are suitable for the manufacture of aqueous binder systems. The term aqueous binder systems is to be understood to means solutions or dispersions that are suitable for gluing, sealing, strengthening or, in general, for treating surfaces. Concrete examples of such solutions or dispersions are starch-like adherent coating materials, especially starch-like adherent coating materials for carpets, adhesives for wall covering materials, dispersion adhesives, leveling compositions, tile adhesives, stone floor compositions, cement-based or gypsum-based filling compositions, floor covering adhesives, thickeners, primers for mineral substrates, and similar materials.

In this connection, starch-like adherent coating materials for carpets are adjusted in terms of their binder content in such a way that they are suitable for a basis weight of 200 $g/m^2$, whereas adhesives for wall covering materials are suitable for basis weights of 200-800 $g/m^2$.

In order to obtain a ready-to-use product, e.g., a starch-like adherent coating material, a dispersion adhesive, a sealant, or a primer for mineral substrates, the finely particulate binder agglomerates in accordance with the invention first have to be mixed with a suitable quantity of water by the user, i.e., they have to be dissolved or dispersed therein.

The particulate binder agglomerates in accordance with the invention generally contain a natural or synthetic polysaccharide. For example, starch or cellulose along with their derivatives, which have been substituted at one or more OH groups and which are obtainable via suitable processes, are suitable as natural or synthetic polysaccharides.

All types of starch such as potato starch, cornstarch, wheat starch, rice starch, milo starch, tapioca starch, or mixtures comprising two or more of the designated starches, etc., are suitable as the starch or the as a basis for the starch derivatives. Starch or starch derivatives, which are based on potato starch or cornstarch or their mixtures, are used within the framework of a preferred form of embodiment of the present invention.

The starch should be capable of dissolving in water or, if applicable, it should at least be capable of swelling in water. Modified starch is especially suitable within the framework of the present invention, whereby an appropriate modification is brought about via a physical or slight chemical action. Concrete examples of such starch derivatives are partially degraded starch and swellable starch.

In particular, the starch derivatives should be capable of dissolving in water, or at least be capable of swelling in water. Starch esters or starch ethers are especially suitable in this connection, especially carboxylated or alkoxylated starches. All the appropriately modified types of natural starch, which have already been designated above, are suitable as the carboxylated or alkoxylated starches. Usable starch derivatives have a degree of carboxylation of approximately 0.1 to approximately 2.0, or a degree of alkoxylation of approximately 0.05 to approximately 1.5. Suitable starch derivatives can also have been crosslinked via bifunctional compounds in the form in which these are known from, e.g., EP-B 0 311 873 (page 3, line 49 through page 4, line 5).

In addition to natural cellulose, the cellulose ethers are also especially suitable as the cellulose compounds. For example, the following are suitable: carboxymethylcellulose (CMC), carboxymethylmethylcellulose (CMMC), ethylcellulose (EC), hydroxypropylcellulose (HPC), hydroxypropylmethylcellulose (HPMC), hydroxybutylcellulose (HBC), hydroxybutylcellulose [sic] (HBMC), hydroxyethyl cellulose (HEC), hydroxyethylcarboxymethyl cellulose (HECMC), hydroxyethylethylcellulose (HEEC), hydropropylcarboxymethylcellulose [sic; hydroxypropylcarboxymethylcellulose] (HPCMC), hydroxypropylmethylcellulose (HPMC), hydroxyethylmethylcellulose (HEMC), methylhydroxyethylcellulose (MHEC), methylhydroxypropylcellulose (MHPC), methylhydroxyethylpropylcellulose (MHEPC), methylcellulose (MC), and propylcellulose (PC), whereby carboxymethylcellulose, methylcellulose, methylhydroxycellulose and methylhydroxypropylcellulose and mixtures comprising two or more thereof along with the alkali metal salts of CMC and of MC, which are readily ethoxylated, or mixtures comprising two or more of the designated compounds can be present.

The designated cellulose derivatives can be readily crosslinked in order that they are soluble at a pH value in excess of 8 and that their dissolution in water be retarded. Crosslinking can take place in a known way, e.g., by means of an addition of glyoxal.

In the case of starch-like adherent coating materials for carpets, the proportion of cellulose ethers predominates relative to the starch derivatives; in the case of adhesives for wall covering materials, the proportion of the starch derivatives predominates relative to the cellulose ethers.

In accordance with [sic; possibly, in addition to] the polysaccharides and the derivatives thereof that have been described, the binder agglomerates in accordance with the invention can also contain synthetic polymers.

Such synthetic polymers are used, for example, for strengthening the adhesive force or for improving the water resistance of the final product that is obtained when using a product that is obtained from a binder agglomerate in accordance with the invention. Redispersible powders comprising fully synthetic polymers (basic polymers) are especially suitable as the synthetic polymers within the framework of the present invention. These are basically homopolymers and copolymers of vinyl alcohol, vinyl esters, styrene, acrylate esters, and vinyl chloride.

A preferred form of embodiment of a mixture of starch-like adherent coating materials for carpets is formed with the following components in wt %:
- 40-70% of at least one conventional commercial cellulose ether, especially methylhydroxypropylcellulose and methylhydroxyethyl cellulose, adjusted to be in finely powdered form and capable of dissolving in a delayed manner;
- 0.1-6.0% of at least one auxiliary agent, especially hydrophilic silicic acid and anhydrous soda;
- 0.1%-10% of cellulose fibers or EFC fibers that have been treated in accordance with the CTMP/TMP process;
- 20%-50% of at least one redispersible powder, especially one comprising homopoly(vinyl acetate).

The mixture of substances that gives rise to the aforementioned mixture of starch-like adherent coating materials should have an apparent density of 300-600 g/L, and especially 400-500 g/L, in accordance with DIN (ISO) 697.

A mixture of substances for a filling composition can be formed with the following components in wt %:
- 70-95%, and especially 80-90%, of gypsum (0.5 hydrate [sic; 0.5 molecules of water of hydration per molecule of gypsum]);
- 5-20%, and especially 5-10%, fillers, especially crystalline calcium carbonate;
- 1-15%, and especially 5-10%, cellulose fibers or EFC fibers that have been treated in accordance with the CTMP/TMP process;
- 0-3%, and especially 0-10%, cellulose ethers;
- 0-3%, and especially 0-0.5%, starch ethers;
- 0-7%, and especially 0.5-3.0%, of at least one redispersable powder comprising a fully synthetic polymer.

An especially preferred mixture of substances has the composition in accordance with mixtures of characterized by the following composition:
- 40-95 wt % of at least one polysaccharide that is capable of dissolving or swelling in water;
- 0.1-10 wt % of at least one cellulose-containing plant fiber that has been pretreated in accordance with the TMP process, CTMP process, or EFC process;
- 1-45 wt % of at least one redispersable powder comprising a fully synthetic polymer;
- 1-15 wt % of at least one additive, such as an antiblocking agent, filler, pH adjuster, or a dye.

In accordance with one embodiment, the invention is characterized by a process for introducing at least one extremely finely divided active substance component into a liquid aqueous system, and it is then characterized by the feature that the active substance component is mixed with a proportion of cellulose-containing plant fibers and this mixture of substances is crushed into a finely particulate form and is introduced into the liquid aqueous system.

Other features of the invention include processes characterized by the fact that the cellulose-containing plant fibers are present in a proportion by weight of 2-18% in the mixture of substances. Processes characterized by the fact that the cellulose-containing plant fibers have average fiber lengths in the 20-350-micrometer range. Processes characterized by the fact that the mixture of substances contains a proportion of additives that improve the action of the active substance components and/or the characteristics of the active substance components in the mixture of substances. Processes characterized by the fact that the liquid aqueous system is water. Processes characterized by the fact that the extremely finely divided active substance component is
- a starch-like adherent coating material for carpets (cellulose ethers, starch ethers);
- a thickener (starch ethers, with and without synthetic resins);
- a wall covering adhesive (starches that are soluble in cold water);
- redispersible powders;
- a cement-like system (leveling composition, tile adhesive);
- a floor covering adhesive; or
- a filling composition, especially one that is based on gypsum, or such a stone floor system describe the features of the invention in the form of the process-related features.

A further preferred form of embodiment comprises the feature that the mixture of substances forms a mixture of starch-like adherent coating materials for carpets with the following components (in wt %):
- 40-70% of at least one conventional commercial cellulose ether, especially methylhydroxypropylcellulose and methylhydroxyethylcellulose that has been adjusted such that it is in finely powdered form and capable of dissolving in a retarded manner;

0.1-6.0% of at least one auxiliary agent, especially hydrophilic silicic acid and anhydrous soda;

0.1-10% of cellulose fibers that have been treated in accordance with the CTMP/TMP process;

20-50% of at least one redispersable powder, especially one comprising homopoly(vinyl acetate).

The apparent density in this regard preferably amounts to 400-500 g/L in accordance with DIN (ISO) 697.

Another preferred form of embodiment comprises the feature that the mixture of substances forms a filling composition with the following components (in wt %):

70-95%, and especially 80-90%, gypsum (0.5 hydrate);

5-20%, and especially 5-10%, fillers, especially crystalline calcium carbonate;

1-15%, and especially 5-10%, cellulose fibers or EFC fibers that have been treated in accordance with the CTMP/TMP process;

0-3%, and especially 0-1.0%, cellulose ethers;

0-3%, and especially 0-0.5%, starch ethers;

0-7%, and especially 0.5-2.0%, at least one redispersable powder comprising a fully synthetic polymer.

Experimental Result:

An experimental result is described below for a conventional commercial starch-like adherent coating material for carpets. The dry material was compacted between two rollers and broken up and sieved to two to four millimeters. Use was made of a d50 CTMP fiber approximately 50 µm average length) as the fiber addition. The compacting pressure is given in metric tons per centimeter of roller length of the compacting roller unit, and the fiber addition is given in wt %.

The composition of the mixture of substances to be compacted corresponded to Mixtures of substances in accordance with one of characterized by the following composition:

40-95 wt % of at least one polysaccharide that is capable of dissolving or swelling in water;

0.1-10 wt % of at least one cellulose-containing plant fiber that has been pretreated in accordance with the TMP process, CTMP process, or EFC process;

0-45 wt % of at least one redispersable powder comprising a fully synthetic polymer;

1-15 wt % of at least one additive, such as an antiblocking agent, filler, pH adjuster, or a dye.

The granulated material, which was manufactured from this after mixing, compacting, and fractionating, was then dissolved by stirring into water in the mixing ratio of 1:30 (one part of power to thirty parts of water) to give a ready-to-use starch-like adherent coating material for carpets.

The following values arose for the dissolution characteristics:

| ① Lösezeit (sec) | Pressdruck (to/cm) ② | Faserzugabe (%) ③ |
|---|---|---|
| 80% nach 276 sec ④ | 2 | 0 |
| 95.6% nach 90 sec ⑤ | 2 | 5 |
| 99.9% nach 60 sec ⑥ | 1.5 | 10 |

Key:
① Dissolution time (sec)
② Compacting pressure (metric tons/cm)
③ Fiber addition (%)
④ 80% after 276 sec
⑤ 95.6% after 90 sec
⑥ 99.9% after 60 sec Key: 1 Dissolution time (sec)
2 Compacting pressure (metric tons/cm)
3 Fiber addition (%)
4 80% after 276 sec
5 95.6% after 90 sec
6 99.9% after 60 sec Thus it is found that the dissolution time is longest by far with a high compacting pressure and with no fiber addition. A fiber addition of 5 wt % decreases the dissolution time to one third for the same compacting pressure. In the case of a fiber addition of 10 wt %, the compacting pressure can be reduced from 2-2.5 metric tons per centimeter of roller length, and a further reduction in dissolution time nevertheless arises with simultaneous completion of the dissolution process.

A further important aspect is that despite the reduced dissolution time that results from the fiber addition, the granulated mixture of substances is surprisingly stable with respect to abrasion. The results of an abrasion test are described in the appended diagram. The granulated material was subjected to sieve analysis in the initial state.

BRIEF DESCRIPTION OF THE DRAWINGS

The grain size distribution that is shown in the form of the lower dashed lines in the diagram arose in this way. The granulated material was then vibrated using a vibration apparatus (IKA or Retsch) over a period of 300 sec at 40 Hz. The subsequent new sieve analysis led to the curve that has been drawn as a full line in the diagram. The proportion of granulated material above a certain size has decreased only slightly, i.e., the curve lies only slightly above the dashed initial curve. Thus, vibration has resulted in only a slight grain [size] reduction; the grains have been abraded only slightly. This might be due to the plant fibers' surface structure, which promotes cohesion, whereby this is achieved as a result of the pretreatment (TMP, CTMP, EFC).

Several sorts of cellulose ethers and starch ethers together with polymer thickeners are frequently combined in order to achieve the best possible thickening effects in the manufacture of thickened formulations for the textile and printing industries. The danger of segregation of the different raw materials is present here if they are not approximated to one another as much as possible in terms of apparent density and grain distribution by means of extremely finely divided grinding. In the case of thickeners, such extremely finely divided active substance components are difficult to mix into a liquid or water. Depending on how rapidly the thickening action sets in, small clumps arise which are surrounded by a gel layer that is in swellable state, whereby this gel layer prevents the further ingress of water. The elastic characteristics of the gel sheath make it difficult to effect dispersion by means of high shear mixing systems, and the consequence of this is an unnecessarily long mixing time with a high shear field that is, in part, harmful to the product.

The advantages of the invention can also be seen from the examples of thickened materials. As a result of their transformation into finely particulate shaped objects, the extremely finely divided active substance components are converted into a granulated material that is readily capable of being stirred into [a liquid]. This also has the advantage of mutually binding active substance components, which differ in terms of apparent density and grain size and grain shape, into a dry, freely flowing, deliverable form in such a way that segregation is rendered impossible.

Improved binding of the extremely finely divided active substance components, and hence improved stability of the granulated material, without having had to increase the compacting pressure, are observed as a result of the addition of the cellulose-containing plant fibers.

The cellulose-containing plant fibers also ensure that the disintegration of the granulated materials is accelerated to a considerable extent following their introduction into a liquid. The finely particulate shaped objects disintegrate more rapidly than the setting in of gel formation in the individual particles. This can be assisted by additives, such as liquiphilic wetting agents, in the mixture of substances.

The invention claimed is:

1. A composition adapted for introduction into a liquid aqueous system, the composition comprising:
   at least one extremely finely divided active substance component that is designated for subsequent dissolution or dispersion in the liquid aqueous system,
   a proportion of cellulose-containing plant fibers that have been chemically or physically pretreated, and that are present in finely divided particulate form, wherein the cellulose-containing plant fibers that have been chemically or physically pretreated are selected from the group consisting of (i) wood clippings disintegrated into fibers using steam under pressure, (ii) wood clippings disintegrated into fibers using chemicals other than water under pressure, and (iii) wood particles treated with an alkaline lye solution under atmospheric pressure.

2. The composition in accordance with claim 1, wherein the cellulose-containing plant fibers are present in a proportion by weight of 2 to 18% in the composition.

3. The composition in accordance with claim 2, wherein the at least one extremely finely divided active substance component is 40 to 95 wt % of at least one polysaccharide that is capable of dissolving or swelling in water, and the composition further comprises:
   0 to 45 wt % of at least one redispersible powder comprising a fully synthetic polymer; and
   1 to 15 wt % of at least one additive, selected from the group consisting of an antiblocking agent, filler, pH adjuster, a dye, and combinations thereof.

4. The composition in accordance with claim 1, wherein the cellulose-containing plant fibers have average fiber lengths from 20 to 350 µm.

5. The composition in accordance with claim 4, wherein the at least one extremely finely divided active substance component is 40 to 95 wt % of at least one polysaccharide that is capable of dissolving or swelling in water, and the composition further comprises:
   0 to 45 wt % of at least one redispersible powder comprising a fully synthetic polymer; and
   1 to 15 wt % of at least one additive, selected from the group consisting of an antiblocking agent, filler, pH adjuster, a dye, and combinations thereof.

6. The composition in accordance with claim 1, further comprising additives that improve the action of the active substance components and/or the characteristics of the active substance components in the composition.

7. The composition in accordance with claim 1, wherein the liquid aqueous system is water.

8. The composition in accordance with claim 7, wherein the at least one extremely finely divided active substance component is 40 to 95 wt % of at least one polysaccharide that is capable of dissolving or swelling in water, and the proportion of cellulose-containing plant fibers that have been chemically or physically pretreated, and that are present in finely divided particulate form is, 0.1 to 10 wt %, and the composition further comprising:
   0 to 45 wt % of at least one redispersible powder comprising a fully synthetic polymer; and
   1 to 15 wt % of at least one additive, selected from the group consisting of an antiblocking agent, filler, pH adjuster, a dye, and combinations thereof.

9. The composition in accordance with claim 1, wherein the extremely finely divided active substance component is selected from the group consisting of
   (i) a starch or starch derivative adherent coating material for carpets;
   (ii) a thickener;
   (iii) a wall covering adhesive;
   (iv) dispersion powders;
   (v) a gypsum-based system;
   (vi) a floor covering adhesive;
   (vii) a filling composition; and (viii) combinations thereof.

10. The composition in accordance with claim 1, wherein the at least one extremely finely divided active substance component is 40 to 95 wt % of at least one polysaccharide that is capable of dissolving or swelling in water.

11. The composition in accordance with claim 1, wherein the proportion of cellulose-containing plant fibers that have been chemically or physically pretreated and that are present in finely divided particulate form is 0.1 to 10 wt %.

12. The composition in accordance with claim 1, wherein the composition further comprises:
   0 to 45 wt % of at least one redispersible powder comprising a fully synthetic polymer.

13. The composition in accordance with claim 1 wherein the composition further comprises:
   1 to 15 wt % of at least one additive, selected from the group consisting of an antiblocking agent, filler, pH adjuster, a dye, and combinations thereof.

14. The composition in accordance with claim 1, wherein the at least one extremely finely divided active substance component is 40 to 95 wt % of at least one polysaccharide that is capable of dissolving or swelling in water, and the proportion of cellulose-containing plant fibers that have been chemically or physically pretreated, and that are present in finely divided particulate form is, 0.1 to 10 wt %, and the composition further comprising:
   0 to 45 wt % of at least one redispersible powder comprising a fully synthetic polymer; and
   1 to 15 wt % of at least one additive, selected from the group consisting of an antiblocking agent, filler, pH adjuster, a dye, and combinations thereof.

15. A process for introducing at least one extremely finely divided active substance component into a liquid aqueous system, the method comprising:
   providing at least one extremely finely divided active substance component;
   providing cellulose-containing plant fibers which have been chemically or physically pretreated;
   mixing the cellulose-containing plant fibers with the extremely finely divided active substance component to produce a blend;
   crushing the blend into a fine particulate form; and
   introducing the crushed particulate blend into a liquid aqueous system, wherein the chemical or physical pretreatment of the cellulose-containing plant fibers is selected from the group consisting of (i) disintegrating the plant fibers using steam under pressure, (ii) disintegrating the plant fibers using chemicals other than water under pressure, and (iii) treating the plant fibers with an alkaline lye solution under atmospheric pressure.

16. The process in accordance with claim 15, wherein the cellulose-containing plant fibers are present in a proportion by weight of 2 to 18% in the blend.

17. The process in accordance with claim 15, wherein the cellulose-containing plant fibers have average fiber lengths from 20 to 350 micrometers.

18. The process in accordance with claim 15, wherein the blend includes a proportion of additives that improve the action of the active substance components and/or the characteristics of the active substance components in the blend.

19. The process in accordance with claim 15, wherein the liquid aqueous system is water.

20. The process in accordance with claim 15, wherein the extremely finely divided active substance component is selected from the group consisting of (i) a starch or starch derivative adherent coating material for carpets;
(ii) a thickener;
(iii) a wall covering adhesive;
(iv) redispersible powders;
(v) a gypsum-based system;
(vi) a floor covering adhesive;
(vii) a tilling composition; and
(viii) combinations thereof.

* * * * *